United States Patent [19]
Klein

[11] Patent Number: 5,540,831
[45] Date of Patent: Jul. 30, 1996

[54] ELECTROLYTIC HYDROGEN STORAGE AND GENERATION

[76] Inventor: Martin Klein, 19 Hillandale Rd., Brookfield, Conn. 06804

[21] Appl. No.: 415,762

[22] Filed: Apr. 3, 1995

Related U.S. Application Data

[63] Continuation of Ser. No. 195,101, Jan. 27, 1994, abandoned, which is a continuation of Ser. No. 850,459, Mar. 10, 1992, abandoned.

[51] Int. Cl.$^6$ .................. C25B 1/02; C25B 11/00
[52] U.S. Cl. .......... 205/630; 204/242; 204/291; 204/293; 204/294; 429/60; 429/206; 429/221; 429/225; 205/638; 425/218; 425/231
[58] Field of Search ................. 204/129, 242, 204/DIG. 4, 292, 293, 294, 291; 429/57, 58, 59, 60, 188, 221, 225, 231, 218, 206; 205/637, 638, 630

[56] References Cited

U.S. PATENT DOCUMENTS

| | | | |
|---|---|---|---|
| 4,048,383 | 9/1977 | Clifford | 204/129 |
| 4,174,565 | 11/1979 | Kordesch | 29/623.2 |
| 4,702,978 | 10/1987 | Heuts et al. | 429/60 |
| 4,797,186 | 1/1989 | Levy et al. | 204/DIG. 4 |
| 5,105,773 | 4/1992 | Cunningham et al. | 204/129 |

*Primary Examiner*—Kathryn Gorgos
*Attorney, Agent, or Firm*—Robin, Blecker, Daley & Driscoll

[57] ABSTRACT

Hydrogen storage and generation is accomplished using an electrolytic cell which employs an inert gas electrode, a rechargeable battery electrode having an active material which stores hydrogen or is close to the potential of hydrogen, and a sealed housing which houses the electrodes, a separator and an aqueous electrolyte and has a port for extracting hydrogen generated in the cell.

20 Claims, 6 Drawing Sheets

ELECTROLYTIC CELL

ELECTROLYTIC CELL

CHARGE

DISCHARGE

COMBINED

REACTIONS

CHARGE

DISCHARGE

CHARGE

DISCHARGE

CADMIUM ANODE CELL

IRON ANODE CELL

HYDRIDE ANODE CELL

ELECTROLYTIC HYDROGEN STORAGE AND GENERATION

This is a continuation application under 37 CFR 1.62 of prior application Ser. No. 08/195,101, filed Jan. 27, 1994, now abandoned, which is a continuation of Ser. No. 07/850,459, filed Mar. 10, 1992, abandoned.

BACKGROUND OF THE INVENTION

This invention relates to hydrogen and, in particular, to an apparatus and method for generating and storing hydrogen.

Hydrogen is recognized as an ideal fuel in many respects. Thus, it is abundantly available in nature, clean burning, benign as a reaction product and has a high energy content. It is also capable of direct reaction in fuel cells. However, hydrogen has not found wide acceptance as a fuel primarily due to the difficulty of transporting and storing it in a compact cost effective manner.

Hydrogen is normally produced by the reforming of coal or hydrocarbon fuels, the dissociation of ammonia, as a biproduct of chemical processes and by the electrolysis of water. In water electrolysis, a D.C. current is passed through an electrolytic cell consisting of two gas evolution electrodes, and water is dissociated to simultaneously produce hydrogen and oxygen gas. The water electrolysis reaction is as follows:

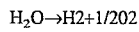

Once generated, hydrogen is typically stored in the liquified state below −253 degrees C. or as a compressed gas at pressures up to 5000 psi. More recently, metal hydrides have been considered as a hydrogen storage media. However, all these storage methods are expensive, consume energy, and are hazardous under certain conditions.

It is, therefore, a primary object of the present invention to provide a compact, safe, low cost hydrogen storage and generation technique.

SUMMARY OF THE INVENTION

In accordance with the principles of the present invention, the above and other objective are realized in an apparatus and method in which an electrolytic cell is employed and in which the electrolytic cell utilizes an inert gas electrode and a battery-type electrode. The battery-type electrode comprises an active material which absorbs hydrogen or is close to the potential of hydrogen.

The electrolytic cell also includes a sealed housing for the gas and battery electrodes. An electrolyte and separator are included in the housing with the electrodes, and the housing is provided with a gas port for enabling hydrogen to be extracted from the housing.

With this configuration for the apparatus, when a charging potential is applied across the electrodes, the water in the electrolyte is disassociated to evolve oxygen at the cathode or inert gas electrode which is vented from the housing. In the meantime, the anode or battery electrode active material is reduced or stores hydrogen at the anode.

If hydrogen is now to be released from the apparatus, a discharging potential reverse to the charging potential is now applied across the cell electrodes. As a result, the anode or battery electrode is now oxidized or stripped of its stored hydrogen. The stripped hydrogen is now evolved from the gas electrode and extracted from the apparatus through the gas port.

The apparatus of the invention thus permits selective storage and generation of hydrogen in a compact, economical cell which is easily transportable.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
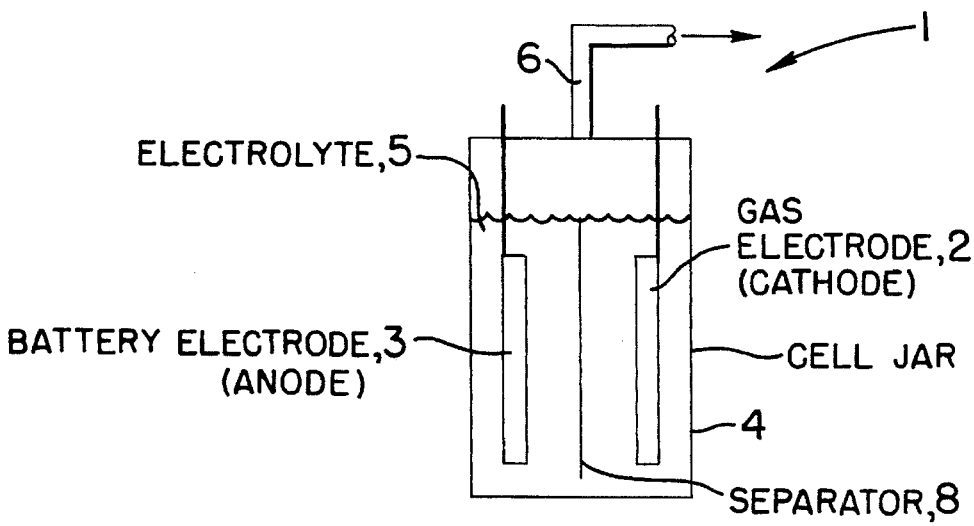
FIG. 1 shows a hydrogen storage and generation apparatus in accordance with the principles of the present invention.

FIG. 1 shows a hydrogen storage and generation apparatus 1 in accordance with the principles of the present invention. The apparatus i is in the form of an electrolytic cell which comprises a first inert gas evolution electrode 2 of a type normally used in electrolysis cells. Preferably, the gas electrode comprises materials and or catalysts that exhibit stable low gas evolution voltages, i.e. spinels, raney nickel, nickel/molybdenum, and platinum family catalysts. The apparatus also comprises a second electrode 3 which is a battery-type electrode. The electrode 3 includes an active material which is electrochemically reversible in aqueous electrolytes and stores hydrogen or is close to the potential of hydrogen. In the case shown in FIG. 2, the electrode includes a hydroxide of a generic active material M.

The apparatus 1 also includes a sealed housing 4 which contains the electrodes 2, 3, a separator 8 and an aqueous electrolyte 5. A port 6 in the housing allows oxygen and hydrogen gas generated in the apparatus i as described below to be extracted from the apparatus.

Figure 2:
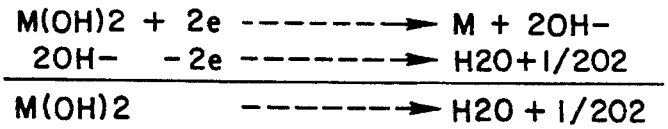
FIG. 2 shows the electrochemical reactions in the apparatus of FIG. 1 during charge and discharge.
Figure 2:
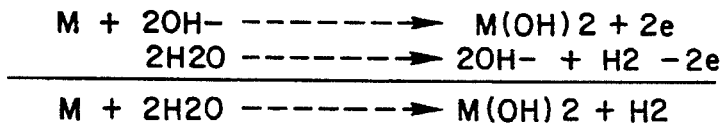
Figure 2:
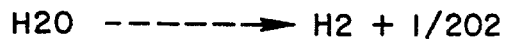

When the electrodes 2 and 3 are subjected to a charging potential at a preselected voltage, the water in the electrolyte 5 is dissociated to evolve oxygen at the cathode or gas electrode 2. The evolved oxygen is then vented from the housing 4 via the port 6. The anode or battery electrode, in turn, is reduced or hydrogen is stored. When the electrodes are then subjected to a discharging potential (a potential in the opposite direction to the charging potential) hydrogen is evolved from the gas or cathode electrode 2 and the anode or battery electrode 3 is stripped of hydrogen or oxidized. In the overall process, water is disassociated to form oxygen during charge and hydrogen during discharge. FIG. 2 shows these reactions of the apparatus 1 for the generic active material M.

In the apparatus 1, oxygen and hydrogen gases are generated separately during the different charge and discharge stages and most or all of the energy is required during the oxygen generation stage. This is in contrast to a water electrolysis system in which hydrogen and oxygen gases are simultaneously, continuously generated at a relatively constant power input for a given gas output. Like the electrolysis system, the apparatus 1 consumes water which must be replaced periodically to insure stable operation.

Table I below is a list of active materials M which can be used as the anode or battery electrode 3 of the FIG. 1 apparatus.

TABLE I

| | Electrode Options | | |
|---|---|---|---|
| Electrode (in KOH) | Std. Voltage vs. Hydrogen (discharge) | Equivalent Weight | Std. Voltage vs. Oxygen (charge) |
| Zinc | 0.47 | 32.69 | 1.646 |
| Iron | 0.049 | 27.93 | 1.278 |
| Cadmium | 0.019 | 56.2 | 1.21 |
| LaNi5 | 0 | 86.47 | 1.23 |
| Lead (acid) | 0.350 | 103.6 | 1.685 |
| Activated Carbon | | | |
| Raney Nickel | | | |
| Metal Hydrides | | | |
| $MnNi_{3.55}C_{0.75}Mn_{.4}Al_{.3}$ | | | |
| $MnNi_{3.5}Co_{.7}Al_{.8}$ | | | |
| $Ti_{1.6}V_{2.2}Zr_{1.6}N_{4.2}CR_{.7}$ | | | |
| Metal Hydrides $AB_5$, $AB_3$ | | | |

Also set forth in Table I are the theoretical potentials for the oxygen evolution (charge) and hydrogen evolution (discharge) operating stages or cycles of the apparatus. The table additionally lists the faradaic equivalents of the anode materials which is also the pounds of reactant theoretically required to generate one pound of hydrogen.

As can be seen from the Table I, most or all of the energy required for a charge/discharge cycle is required during the charge process. If the cells hydrogen evolution potential is close to zero, a source of energy is needed to drive the hydrogen evolution process due to resitance and overvoltage loses. However, this potential is relatively low, therefore, making the apparatus suitable for mobile and energy management applications.

The choice of the appropriate anode or battery electrode active material is, of course, application dependent because different active materials exhibit different cost, life, weight, and operating voltage. The gas evolution electrode should contain catalysts to lower the gas evolution potential thereby reducing the apparatus energy consumption.

Figure 3A:
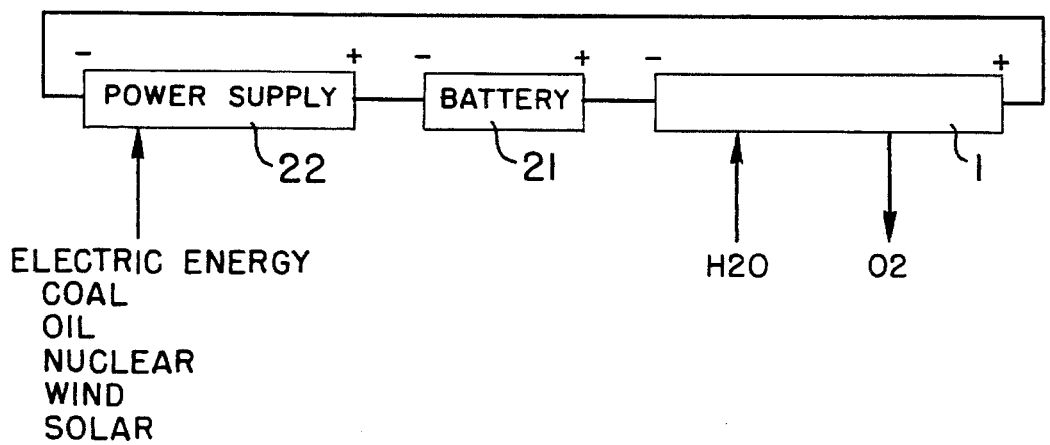
FIGS. 3A and 3B illustrate a first configuration of a system utilizing the hydrogen storage and generation apparatus of the invention.
Figure 3B:
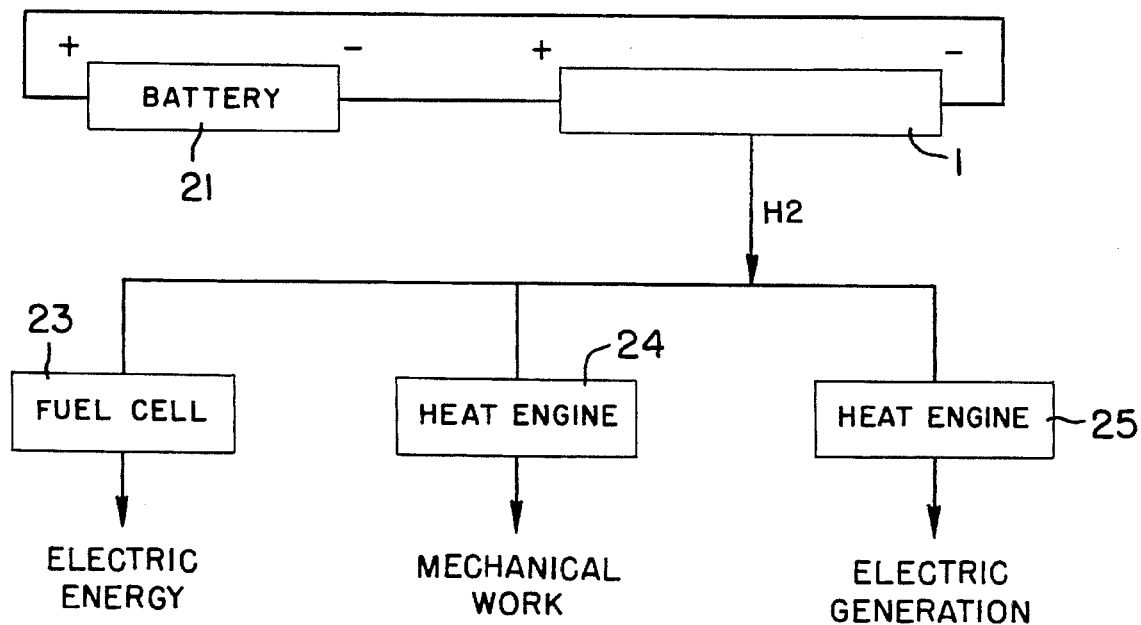
Figure 4A:
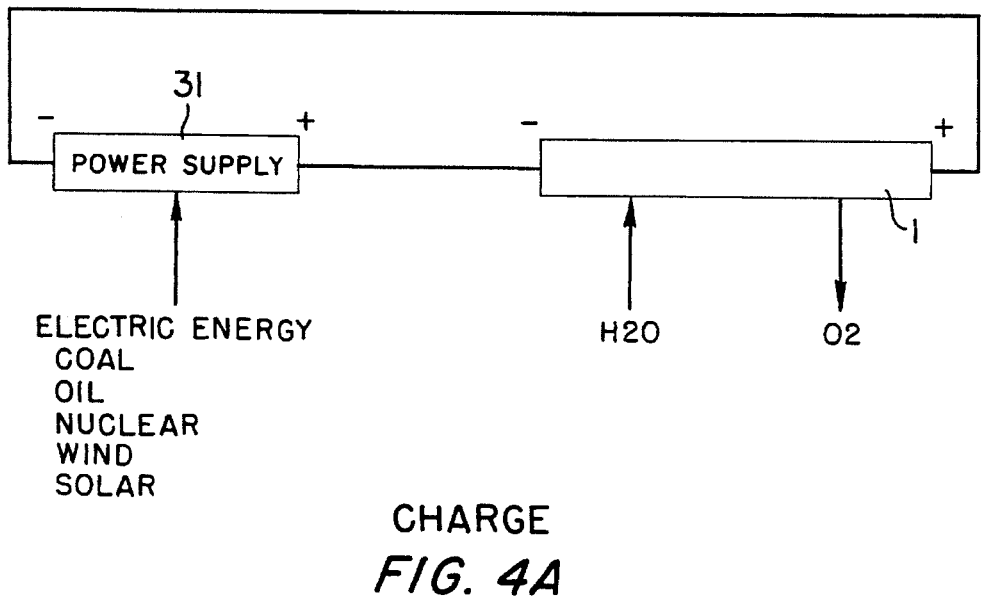
FIGS. 4A and 4B illustrate a second configuration of a system utilizing the hydrogen storage and generation apparatus of the invention.
Figure 4B:
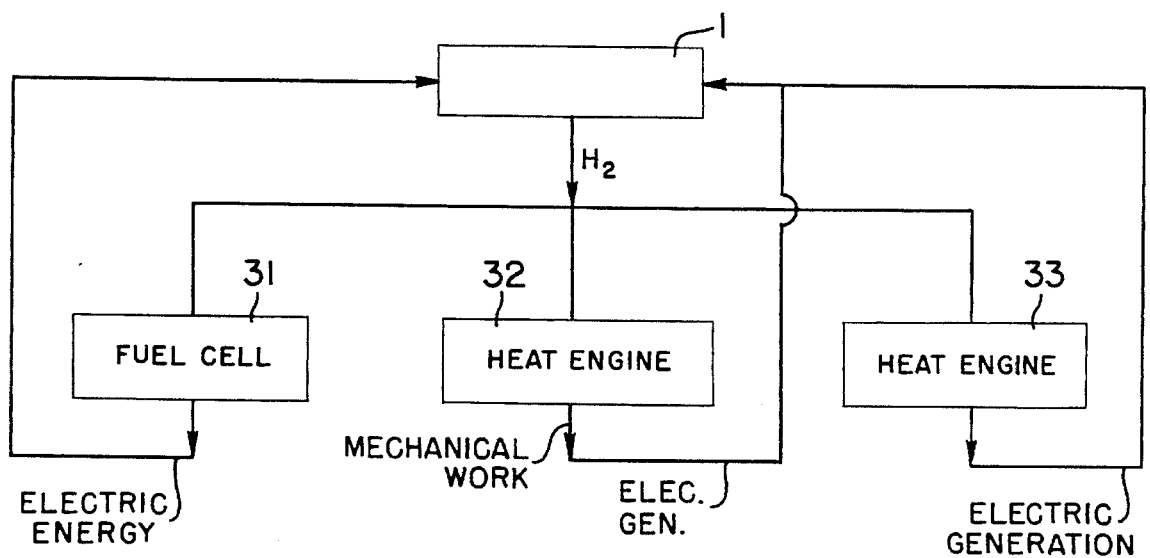

The apparatus of the invention can be utilized in two basic configurations. One configuration is shown in FIGS. 3A and 3B. The other is shown in FIGS. 4A and 4B. The differences in these constructions involves the method of providing energy to drive the hydrogen evolution stage.

In the first configuration shown in FIGS. 3A and 3B, an auxiliary battery 21 and the apparatus 1 are charged from a power source 22. When hydrogen is required, the auxiliary battery 21 powers the apparatus 1 to deliver hydrogen as required to the utilization device, show as, a fuel cell 23 or heat engines 24 or 25 in FIG. 3B.

In the second configuration shown in FIGS. 4A and 4B, the apparatus 1 is charged directly by a power supply 31. During hydrogen evolution, if power is required, it is derived from part of the energy generated by the device utilizing the generated hydrogen, i.e., in a fuel cell 31, or heat engine 32 or 33.

Example 1

An electrolytic cell embodying the apparatus 1 of the invention was constructed and included three parallel pressed rechargeable cadmium battery electrodes. Each electrode measured 3 inches by 4 inches and combined had nominally 30 ampere hours of cadmium capacity. A non woven nylon absorber separator material was placed on the cadmium electrodes and a plastic spacer was placed between the these electrodes and the gas counter electrodes. Four nickel screens of the same size of the cadmium electrodes were used as the latter gas electrodes. The cell was filled with an electrolyte of 35% KOH. The cell was charged and discharged using a commercial D.C. power supply powered by standard 110 A.C. power.

Figure 5:
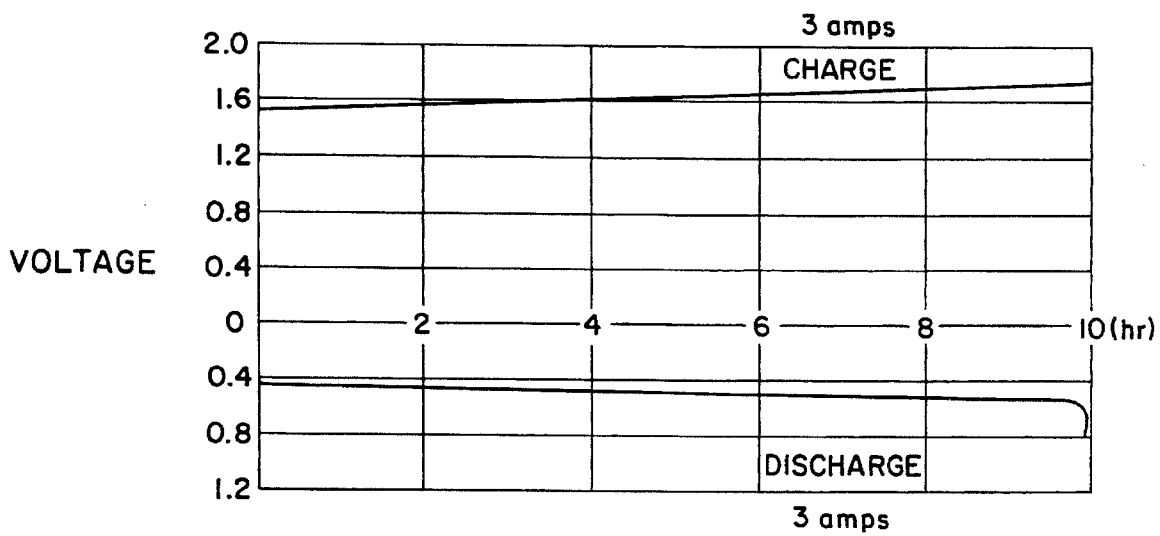
FIG. 5 shows the charge and discharge voltage of a first illustrative example of the apparatus of FIG. 1.

FIG. 5 shows the cell voltage during charging in which the cadmium hydroxide at the battery electrode is reduced to cadmium and oxygen is evolved on the nickel screen gas electrode. In the charged state, the cell is stable and can be stored for long periods of time. When hydrogen was required, it was necessary supply a low voltage in the reverse direction across the cell t release the hydrogen. This was provided, as above-mentioned, by commercial power through a D.C. power supply. However, it could also have been provided by a rechargeable battery charged either when the cell was charged or at a different time, by a fuel cell that utilizes a portion of the hydrogen generated from the cell, or by a generator that is powered by a portion of the energy generated from the hydrogen via a heat engine.

FIG. 5 also shows the voltage of the cell during the discharge process when hydrogen is liberated and the cadmium electrode is oxidized. The reactions are as follows:

Charge

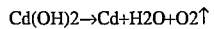

$$Cd(OH)2 \rightarrow Cd+H2O+O2\uparrow$$

Discharge

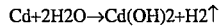

$$Cd+2H2O \rightarrow Cd(OH)2+H2\uparrow$$

During the complete cycle, water is consumed and must be periodically replaced to maintain stable operation.

The total hydrogen available from the FIG. 5 cell is directly proportional to the active quantity of cadmium in the cell. Thus, the amount of hydrogen derivable from the cell can be controlled by selecting the size of the parallel cadmium battery electrodes. Additionally, multiple FIG. 5 cells can be arranged in series. In such a multicell case, a common manifold might be used to collect the hydrogen and to provide water to the different cells.

In use, the FIG. 5 cell would be repeatedly charged and discharged in the same manner as above. The life of this cell is expected to be many thousands of cycles based on the demonstrated life of rechargeable cadmium electrodes in nickel cadmium batteries.

Example 2

A second electrolytic cell embodying the apparatus 1 of the invention was also constructed. This second cell comprised a sintered rechargeable iron battery electrode. This electrode measured 3 inches by 3 inches and contained 15 grams of iron. The cell further included an open mesh plastic separator material, two nickel screen gas electrodes and an electrolyte of 35% KOH. The cell was charged using a commercial D.C. power supply powered by standard 110 A.C. power.

Figure 6:
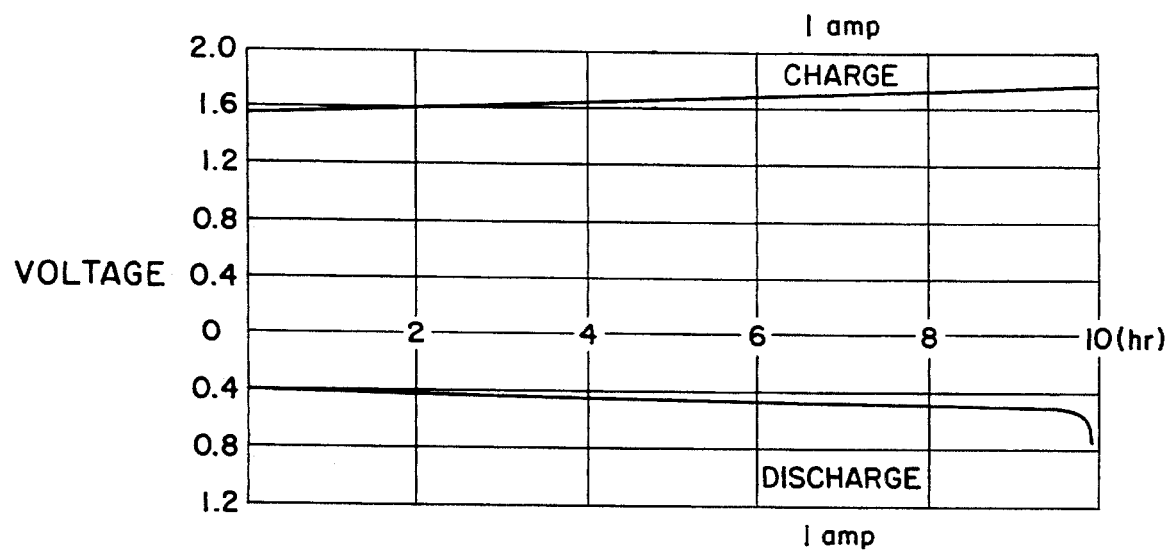
FIG. 6 shows the charge and discharge voltage of a second illustrative example of the apparatus of FIG. 1.

FIG. 6 shows the cell voltage during the charging cycle in which the iron hydroxide of the battery electrode is reduced to iron and oxygen is evolved on the nickel screen gas electrode. In the charged state, the cell is stable and can be stored for long periods of time. When hydrogen is required, it is necessary to supply a low voltage in the reverse direction across the cell to release the hydrogen. This voltage can be provided in the same manner as described for the electrolytic cell in the previous example.

FIG. 6 also shows the voltage of the cell during the discharge cycle when hydrogen is liberated at the gas electrode and the iron battery electrode is oxidized. The reactions are follows:

Charge $$Fe(OH)_2 \rightarrow Fe+H_2O+O_2\uparrow$$

Discharge $$Fe+2H_2O \rightarrow Fe(OH)_2+H_2\uparrow$$

Again, as with the previous cells, during the complete cycle, water is consumed and must be periodically replaced to maintain stable operation. Furthermore, the hydrogen available from the cell is again directly proportional to the active quantity of iron in the cell which can be controlled by controlling the size of the battery electrodes in the cell.

Example 3

A third electrolytic cell was constructed consisting of a plastic bonded metal hydride electrode made up of 2% Teflon, 10% nickel metal powder and 88% by weight of MmNi3.55Co0.75Mn0.4A1.3, a non woven nylon separator material, two 0.002 inch thick nickel foil gas electrodes and an electrolyte of 35% KOH. Each of the electrodes where 2 by 2 inches. The cell was charged using a commercial D.C. power supply powered by standard 110 A.C. power.

Figure 7:
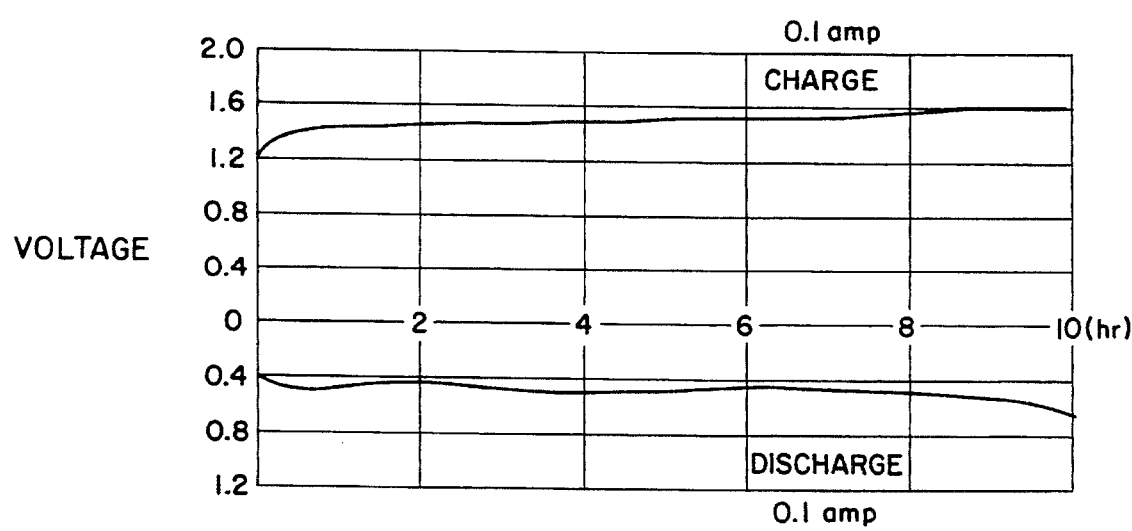
FIG. 7 shows the charge and discharge voltage of a third illustrative example of the apparatus of FIG. 1.

FIG. 7 shows the cell voltage during the charging cycle in which hydrogen is stored in the hydride electrode and oxygen is evolved on the nickel foil. In the charged state, the cell is stable and can be stored for periods of time. When hydrogen is required it is necessary to suply a low voltage in the reverse direction across the cell to release the hydrogen. This can be provided by commercial power through a D.C. power supply, a rechargable battery charged when the cell was charged or at a different time, a fuel cell that utilizes a portion of the hydrogen generated from the cell, or a generator that is powered by portion of the energy generated from the hydrogen via a heat engine.

FIG. 7 also shows the voltage of the cell during the discharge process when hydrogen is liberated from the hydride electrode and evolved on the surface of the nicel foil electrodes. The reactions are as follows:

Charge $$M(\text{metal hydride})+H_2O \ldots MH+O_2$$

Discharge $$2MH \ldots M+H_2$$

During the complete cycle, water is consumed and must be periodically replaced to maintain stable operation.

The hydrogen available from the cell is directly proportional to the active quantity of hydride in the cell which can be arranged in the cell in parallel electrodes of any size and or multiple cells in series. In multicell arrangements, it would be appropriate to use a common manifold to collect the hydrogen and to provide water to the cells.

In repeated use applications, the cells would be repeatedly charged and discharged in the same manner as above. The life of this cell is expected to be many hundereds of cycle based on the demonstrated life of rechargable hydride electrodes in nickel metal hydride batteries.

Table II shows the preliminary design of a 2.5 pound hydrogen system (the energy equivalent of one gallon of gasoline) employing the apparatus 1 of the invention utilizing iron anodes. In the disclosed design, 50 electrolytic cells each like the apparatus 1 are arranged in series. Each cell contains 16 iron battery electrodes and 17 gas electrodes.

TABLE II

| Preliminary 2.5 Pound Hydrogen System Design | |
|---|---|
| Number of cells | 50 |
| Capacity per cell | 614 Ahr |
| Iron electrode size | 6 in × 6 in × .060 in |
| Iron weight (50% excess) | 962 gms |
| Number of Iron Electrodes | 16 |
| Collector weight | 172 gms |
| Gas Electrode size | 6 in × 6 in |
| Number of gas electrodes | 17 |
| Gas electrodes weight | 172 gms |
| Separator weight | 172 gms |
| Electrolyte concentration | 25%–45% KOH |
| Electrolyte weight | 925 gms |
| Cell Jar size | 6.25 × 8.25 × 2.25 in |
| Cell Jar weight | 200 gms |
| Terminals and misc. weight | 150 gms |
| TOTAL CELL WEIGHT | 2764 gms (6.1 lbs) |
| TOTAL WEIGHT (50 cells) | 305 lbs |

The hydrogen generation and storage apparatus of the invention can have many applications. The following are illustrative of these applications.

1. Fuel for Automobiles, Trucks, Busses

Mobile vehicles powered by internal combustion engines or fuel cells could be powered by hydrogen generated from the hydrogen generation apparatus 1 of the invention. The apparatus would be charged from electric power during utility off peak periods. The vehicles could also be designed for dual fuel use. Thus, the vehicles could use hydrogen in restricted pollution environments and liquid hydrocarbon for extended range.

2. Fuel Supplement

It is recognized that internal combustion diesel or gasoline engines emit higher levels of pollutants during startup and or peak demands than at nominal constant speed. Such devices could thus use clean burning hydrogen generated by the apparatus of the invention during these periods as a means of reducing pollution. In this case, the apparatus 1 of the invention could be recharged via regenerative braking to conserve energy, or from the vehicle generator or during non vehicle use times from external power.

3. In Plant Vehicles, Fork Lifts etc.

Mobile vehicles used in a plant are subject to stricter pollution requirements than out door vehicles. This has led to the use of propane fueled or lead acid powered electric vehicles. The propane vehicles still emit nocuous exhaust, and the battery vehicles are sometimes range limited and are costly. Thus, the apparatus 1 of the invention could be used to supply hydrogen for powering these vehicles. In this application, the apparatus could be charged during the non work or equipment idle periods and would power the vehicles via a heat engine or fuel cell.

4. Utility Off Peak Energy Storage

Many utilities have load profiles that consist of peak demand times during the morning and early evening hours and light demand times during the late evening hours. This results in typically utilizing costly fueled gas turbines to meet the peaks and not fully utilizing base load equipment during the evenings. In this application, the apparatus of the invention could be charged using idle generating capacity during the night time hours, and the hydrogen would be released during the peak times to power or as a fuel supplement for gas turbines, fuel cells or any hydrogen driven equipment.

5. Standby Power Supplies

Due to unpredicted power interruption, many electric users install standby electric generation equipment to meet emergencies. These typically consist of batteries, gasoline generators or diesel generators. The latter two are difficult to maintain due to the use of hydrocarbon fuels, are unreliable and emit pollutants and the batteries are sometimes capacity limited. In this application, the apparatus 1 of the invention could provide clean hydrogen to the power generating equipment during the power outages.

6. Solar, Wind Energy Storage

Solar and wind power generators provide intermittent power due to the erratic nature of their primary source of power. To provide non interruptible power, they have to be connected to the electric grid or have an energy storage subsystem. The apparatus of the invention could provide energy storage by being charged when energy is available and feed hydrogen to a heat engine or fuel cell generator during the non operating periods of the solar or wind generators.

7. Chemical Hydrogen

Hydrogen is used as a coolant, inert cover gas and in many other chemical processes. The apparatus of the invention could be operated to deliver hydrogen on demand for these applications. If steady state hydrogen is required, two systems can be alternately charged and discharged.

In all cases, it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. An apparatus comprising:

an assembly for storing and generating hydrogen including:

an inert gas electrode;

a rechargeable battery electrode containing an active material which stores hydrogen during charging and which releases stored hydrogen during discharging;

a sealed housing containing said gas and battery electrodes and which receives an aqueous electrolyte, said housing including a port for extracting hydrogen from said assembly during discharging.

2. Apparatus in accordance with claim 1 wherein:

said active material includes at least one of the following: a material including zinc, a material including iron, a material including cadmium, a material including LaNi5, a material including lead, a material including activated carbon, a material including raney nickel and a material including metal hydrides.

3. Apparatus in accordance with claim 2 wherein:

said material including zinc is zinc hydroxide, said material including cadmium is cadmium hydroxide, said material including iron is iron hydroxide and said material including lead is lead hydroxide.

4. Apparatus in accordance with claim 1 wherein:

said apparatus further includes: means for applying a charging potential to said electrodes to evolve oxygen gas at said gas electrode and to reduce said battery electrode to store hydrogen; and means for applying a discharging potential to said electrodes to oxidize said battery electrode to release said stored hydrogen and evolve hydrogen gas at said gas electrode for extraction from said assembly through said port.

5. Apparatus in accordance with claim 4 wherein;

said means for applying a discharging potentional comprises a DC battery.

6. Apparatus in accordance with claim 5 wherein:

said means for applying a charging potential comprises a AC source which feeds said DC battery and said electrodes.

7. Apparatus in accordance with claim 4 wherein:

said means for applying said discharging potential comprises a hydrogen utilization device which utilizes said hydrogen when extracted from said assembly.

8. Apparatus in accordance with claim 1 wherein:

said electrolyte is KOH.

9. Apparatus in accordance with claim 1 wherein:

said gas electrode comprises a nickel screen, a spinel catalyst, raney nickel, nickel/molybdenum, or platinum family metals.

10. Apparatus in accordance with claim 1 further comprising:

a utilization device for using the hydrogen extracted from said assembly, said utilization device including one or more of the following: a fuel cell, an internal combustion engine, a gas turbine and a heat engine.

11. A method comprising:

providing an assembly for storing and generating hydrogen including: an inert gas electrode; a rechargeable battery electrode containing an active material which stores hydrogen during charging and which releases stored hydrogen during discharging; a sealed housing containing said gas and battery electrodes and which receives an aqueous electrolyte, said housing including a port for extracting hydrogen from said assembly during discharging;

and extracting hydrogen from said assembly during discharging.

12. A method in accordance with claim 11 wherein:

said active material includes at least one of the following: a material including zinc, a material including iron, a material including cadmium, a material including LaNi5, a material including lead, a material including activated carbon, a material including raney nickel and a material including metal hydrides.

13. A method in accordance with claim 12 wherein:

said material including zinc is zinc hydroxide, said material including cadmium is cadmium hydroxide, said material including iron is iron hydroxide and said material including lead is lead hydroxide.

14. A method in accordance with claim 11 wherein:

said method further includes: applying a charging potential to said electrodes to evolve oxygen gas at said gas electrode and to reduce said battery electrode to store hydrogen; and applying a discharging potential to said electrodes to oxidize said battery electrode to release stored hydrogen and evolve hydrogen gas at said gas electrode for extraction from said assembly through said port.

15. A method in accordance with claim 14 wherein;

said discharging potentional is applied with a DC battery.

16. A method in accordance with claim 15 wherein:

said charging potential is applied with a AC source which feeds said DC battery and said electrodes.

17. A method in accordance with claim 16 wherein:

said discharging potential is applied using a hydrogen utilization device which utilizes said hydrogen when extracted from said assembly.

18. A method in accordance with claim 11 wherein:

said electrolyte is KOH.

19. A method in accordance with claim 11 wherein:

said gas electrode comprises a nickel screen or spinel catalysts, raney nickel, nickel/molybdenum, or platinum family metals.

20. A method in accordance with claim 11 further comprising:

using the hydrogen extracted from said assembly in a utilization device, said utilization device including one or more of the following: a fuel cell, an internal combustion engine, a gas turbine and a heat engine.

\* \* \* \* \*

UNITED STATES PATENT AND TRADEMARK OFFICE
CERTIFICATE OF CORRECTION

PATENT NO. : 5,540,831

DATED : July 30, 1996

INVENTOR(S): Martin Klein

It is certified that error appears in the above-identified patent and that said Letters Patent is hereby corrected as shown below:

Col. 5, line 23, after "Teflon" insert -- (i.e., polytetrafluoroethylene) --.

Col. 5, line 62, change "hundereds" to -- hundreds --.

Col. 6, line 30, after "apparatus" insert -- 1 --.

Signed and Sealed this

Eighteenth Day of March, 1997

Attest:

Attesting Officer

BRUCE LEHMAN

Commissioner of Patents and Trademarks